United States Patent [19]

Rhee et al.

[11] Patent Number: 5,453,484

[45] Date of Patent: Sep. 26, 1995

[54] COPOLYIMIDES AND A PROCESS FOR THE PREPARATION THEREOF

[75] Inventors: Suh Bong Rhee, Doryong-Dong; Ji Young Chang, Doyrong-Dong; Bong Seok Moon, Kwaejung-Dong; Ji-Woong Park, Shinsung-Dong, all of Rep. of Korea

[73] Assignee: Korea Research Institute of Chemical Technology, Daejun, Rep. of Korea

[21] Appl. No.: 268,979

[22] Filed: Jun. 30, 1994

Related U.S. Application Data

[62] Division of Ser. No. 930,376, Aug. 17, 1992, Pat. No. 5,357,032.

[30] Foreign Application Priority Data

Nov. 13, 1991 [KR] Rep. of Korea ............... 91-20171

[51] Int. Cl.$^6$ .................... C08G 73/10; C08G 69/26
[52] U.S. Cl. .................. 528/353; 528/125; 528/128; 528/172; 528/173; 528/176; 528/183; 528/188; 528/220; 528/229; 528/350; 528/351; 524/600; 524/606; 428/473.5
[58] Field of Search ............... 528/353, 350, 528/176, 183, 188, 220, 229, 125, 128, 172, 173; 524/600, 606; 428/473.5

[56] References Cited

U.S. PATENT DOCUMENTS

| | | | |
|---|---|---|---|
| 3,179,634 | 4/1965 | Edwards | 528/353 |
| 3,220,976 | 11/1965 | Goldberg | 528/170 |
| 3,415,782 | 12/1968 | Irwin et al. | 528/353 |
| 4,153,783 | 5/1979 | Gagliani et al. | 528/353 |
| 4,244,853 | 1/1981 | Serafini et al. | 528/353 |
| 4,251,418 | 2/1981 | Chow et al. | 528/229 |
| 4,273,886 | 6/1981 | Gagliani | 528/229 |
| 4,296,208 | 10/1981 | Gagliani et al. | 528/125 |
| 4,299,750 | 11/1981 | Antonoplos et al. | 528/353 |
| 4,305,796 | 12/1981 | Gagliani et al. | 528/353 |
| 4,315,077 | 2/1982 | Gagliani et al. | 528/353 |
| 4,319,000 | 3/1982 | Gagliani et al. | 528/353 |
| 4,332,656 | 6/1982 | Gagliani et al. | 528/353 |
| 4,332,929 | 6/1982 | Holub et al. | 528/353 |
| 4,720,539 | 1/1988 | Rabilloud et al. | 528/353 |
| 4,725,642 | 2/1988 | Gannett et al. | 528/353 |
| 5,175,241 | 12/1992 | Darrow | 528/229 |

OTHER PUBLICATIONS

T. Kaneda et al., "High-Strength-High Modulus Polyimide Fiber II" *Journal of Applied Polymer Sciences*, V 32, 3151–3186, 1986, the month of publication is not available.

*Primary Examiner*—Paul R. Michl
*Assistant Examiner*—P. Hampton-Hightower
*Attorney, Agent, or Firm*—Birch, Stewart, Kolasch & Birch

[57] ABSTRACT

A diamine compound of the general formula

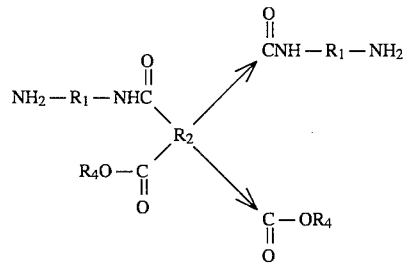

wherein the arrows denote isomerism, $R_1$ is a divalent aromatic group selected from the group consisting of

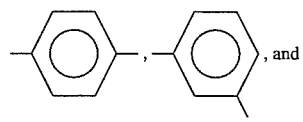

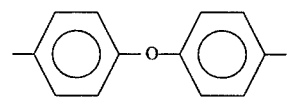

$R_2$ is a tetravalent aromatic group selected from the group consisting of

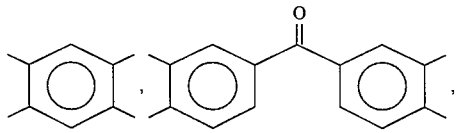

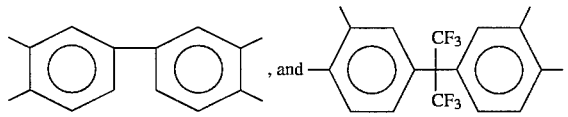

and $R_4$ is a monovalent aliphatic group selected from the group consisting of ethyl and isopropyl; and, a process for preparing same.

7 Claims, 1 Drawing Sheet

COPOLYIMIDES AND A PROCESS FOR THE PREPARATION THEREOF

This application is a divisional application of U.S. patent application Ser. No. 07/930,376, filed on Aug. 17, 1992, which issued on Oct. 18, 1994 as U.S. Pat. No. 5,357,032.

BACKGROUND OF THE INVENTION

1. Field of the Invention

The present invention relates to new types of copolyamides and a process for the preparation thereof for use in films, insulating coatings, molding products, and the like due to their excellent thermal stabilities and mechanical and electrical properties.

2. Description of the Prior Art

Various types of polyimides are known in the art. The polyimides exhibit excellent thermal stabilities and mechanical properties. The polyimides, however, have high glass transition temperatures so that they exhibit problems with respect to processability. In order to improve the processabilities of the polyimides, they are manufactured from aromatic diamines containing "flexible hinges". However, most of these polyimides have decreased thermal stabilities.

In order to improve the properties of such prior art polyimides through copolymerization method, processes for the preparations of random copolyimides are known in the art, wherein one aromatic dianhydride and at least two aromatic diamines or one aromatic diamine and at least two aromatic dianhydrides are used. However, such processes require caution in each step since such copolymers can change their properties depending on the copolymerization conditions.

SUMMARY OF THE INVENTION

Accordingly, it is an object of the present invention to provide improved copolyimides of well-defined structures as well as an improved process for preparing copolyimides which eliminate the problems encountered with conventional processes for preparing copolyimides.

Another object of the present invention is to provide a process for the preparation of alternating copolyimides, comprising reacting an aromatic dianhydride with an aromatic diamine containing a different dianhydride unit in the structure so that the resulting copolyimides have an alternating sequence of two different dianhydride units. The produced copolyimides exhibit excellent mechanical properties and thermal stabilities.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
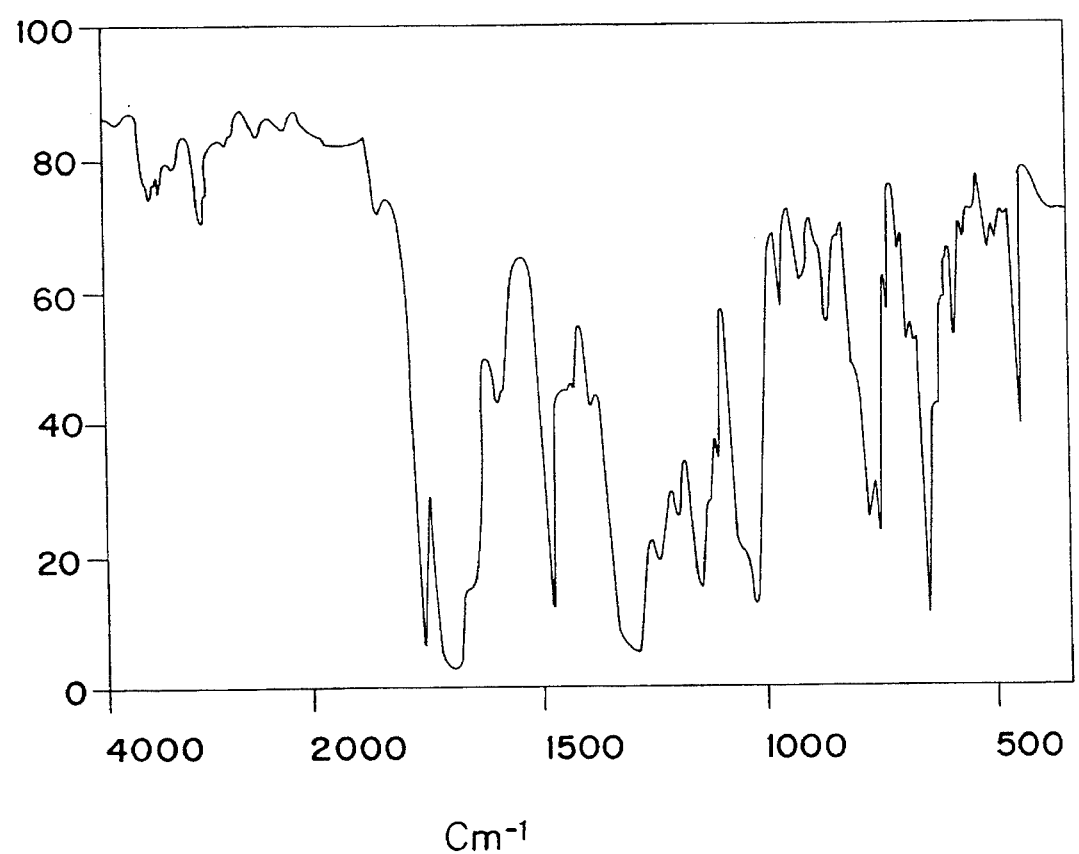
FIG. 1 shows the IR spectrum of the copolyimides produced by an example according to the present invention.

Referring now to the present invention, there is provided copolyimides having excellent mechanical properties and thermal stabilities, and a process for manufacturing the same.

The present invention is directed to a process for the preparation of copolyimides having excellent thermal stabilities and mechanical properties having a repeating unit of the general formula (1),

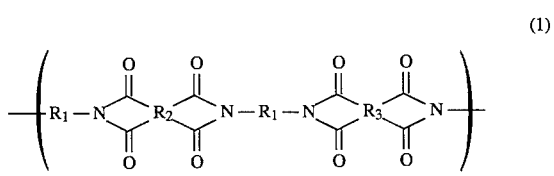

which comprises the steps of reacting one aromatic diamine of the general formula (2),

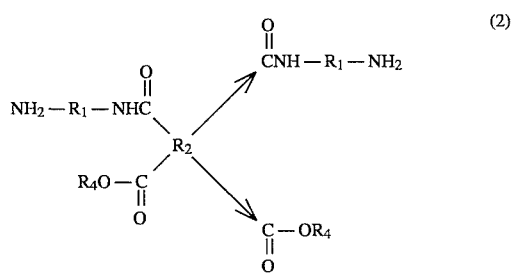

with one aromatic tetracarboxylic dianhydride of the general formula (3),

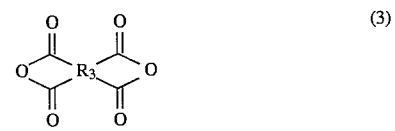

in the presence of organic solvent to produce a polyamic acid ester consisting of repeating units of the general formula (4),

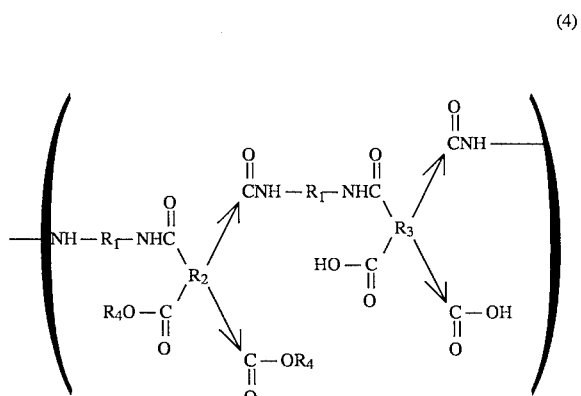

and conversion of this polyamic acid ester to the copolyimide consisting of repeating units of the formula (1) by heating from a temperature of 40° C. to 500° C. wherein the arrows denote isomerism so that the groups to which they point may exist as shown or in interchanged positions, $R_1$ is a divalent aromatic group selected from the class consisting of

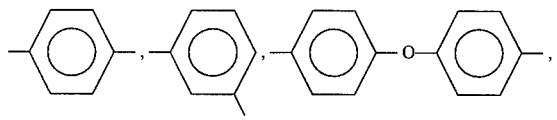

etc., $R_2$ and $R_3$ are tetravalent aromatic groups selected from the class consisting of

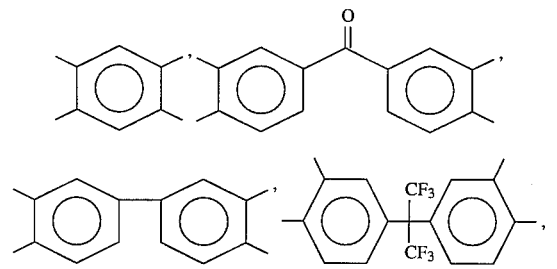

etc., where they are selected to be different each other, and $R_4$ is a monovalent alkyl group selected from the class consisting of ethyl, isopropyl, etc.

Diamine monomers of the formula (2) according to the present invention are formed starting from reacting aromatic dianhydrides such as pyromellitic dianhydride, 3,3',4,4'-benzophenonetetracarboxylic dianhydride, 3,3',4,4'-biphenyltetracarboxylic dianhydride or 2,2-bis(3,4-dicarboxyphenyl)-1,1,1,3,3,3-hexafluropropane dianhydride with aliphatic alcohol such as ethanol or isopropanol to produce aromatic tetracarboxylic acid diesters represented by the general formula (5),

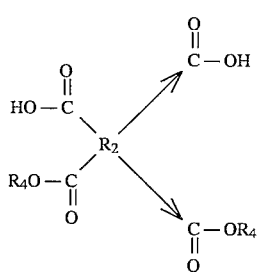

wherein the arrows denote isomerism, $R_2$ is a tetravalent aromatic group selected from the class consisting of

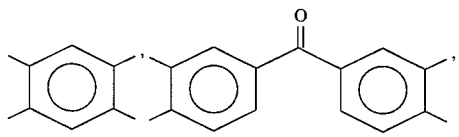

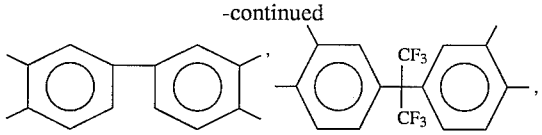

etc., and $R_4$ is an monovalent alkyl group selected from the class consisting of ethyl, isopropyl, etc.

The aforesaid aromatic tetracarboxylic acid diesters consists of two or three isomers coming from the differences in the positions of the ester and carboxylic acid groups in the aromatic ring.

With or without isolation of each isomers, the said aromatic tetracarboxylic acid diesters react with acylating agents to produce acyl derivatives represented by the general formula (6),

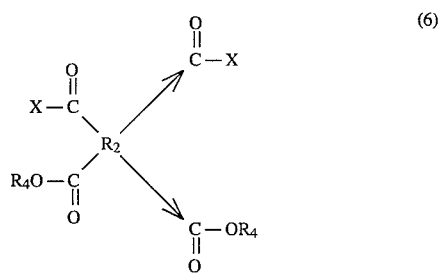

wherein the arrows denote isomerism, $R_4$ is a monovalent aliphatic group selected from the class consisting of ethyl, isopropyl, etc. and X is selected from the class consisting of chlorine and $OCO_2CH_2CH_3$.

The acylating agents are thionylchoride, ethyl chloroformate, and the like.

In detail, when X is Cl in the formula (6), the diacyl chloride intermediates react with aromatic nitroamines such as 4-nitroaniline, 3-nitroaniline, and 4-(4-nitrophenoxy)aniline followed by catalytic hydrogenation of the nitro group of the resulting nitroarylaromatic amide represented by the general formula (7),

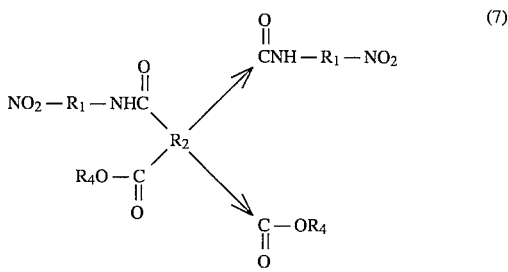

wherein the arrows denote isomerism, $R_1$ is a divalent aromatic group selected from the class consisting of

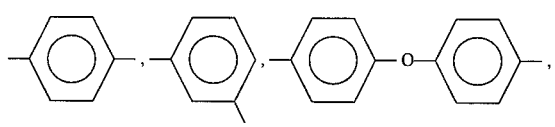

etc., $R_2$ is a tetravalent aromatic group selected from the class consisting of

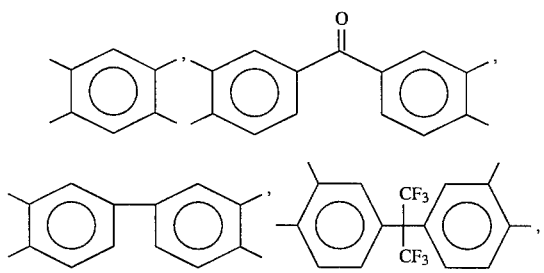

etc., and $R_4$ is a monovalent alkyl group selected from the class consisting of ethyl, isopropyl, etc., to produce diamine monomers of the present invention represented by the formula (2). In the case that X is $OCO_2CH_2CH_3$, the mixed anhydride intermediates react with an excess of aromatic diamines such as p-phenylenediamine, m-phenylenediamine and 4-(4-aminophenoxy)aniline to produce the diamine monomers of the formula (2).

Each of the diamine monomers of the formula (2) also consists of isomers which have different substituting positions in aromatic rings with respect to the ester and amide groups. This is originated from the processes for preparing the said aromatic tetracarboxylic acid diesters of the formula (5). When they are heated at a temperature sufficient for imidization, however, the isomers produce the same imide structures regardless of different isomer structures by abstracting alcohols therefrom, and the structural differences between the isomers disappeared. Accordingly, eventhough each of the diamine monomers of the formula (2) consists of two or three structural isomers, they can be used, in the present invention, without separation of individual isomers, to produce polyimides of the same structure.

The diamine monomers react with aromatic dianhydrides in the presence of an organic solvent to produce polyamic acid esters thereof. At this time, the solvent is selected from the group consisting of N,N-dimethylacetamide, N,N-dimethylformamide, N,N-diethylacetamide, and N-methyl-2-pyrrolidinone and the concentrations of resulting polymer solutions are controlled within the ranges from 0.5 to 50 weight %, preferably from 5 to 25%. In more detail, the diamine monomers react with aromatic dianhydrides at a temperature of below 50° C. for 1 to 24 hours to produce viscous solutions of polyamic acid ester consisting of repeating units of the above formula (4).

The polyamic acid esters represented according to the present invention possess inherent viscosities of 0.1 to 3.0 dl/g in N,N-dimethylacetamide or N-methyl-2-pyrollidinone, when measured for 0.5 g/dl solutions at 30° C., preferably of 0.3 to 2.0 dl/g. Since half of the carboxylic acid groups in the structure of the polyamic acid esters represented by the formula (4) are already esterified, the polyamic acid esters exhibit excellent solubilities and improved stabilities in the polymerization solutions when compared with polyamic acids produced from direct reaction of aromatic diamines with aromatic tetracarboxylic dianhydrides.

The polyamic acid esters of the formula (4) were cyclized by heating at a temperature range between 50° and 400° C. to produce the corresponding polyimides of the formula (1).

In the practice of the invention, for instance, the polyamic acid ester solutions of 0.5~50 weight % in the aforesaid solvents are casted on the glass plates and heated at 80° C. for 1 hour under vacuum, air or nitrogen atmosphere. The resulting polyamic acid ester films which are still holding sonic solvent are heated further up to 400° C. stepwisely or continuously to produce yellow transparent polyimide films.

The polyimides of the formula (1) consist of alternately repealing units derived from two different aromatic dianhydrides. In detail, the polyimides of the formula (1) according to the present invention are alternating copolyimides consisting of the following two different diimide repeating units of the general formulas (8) and (9),

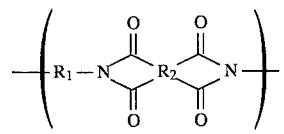

(8)

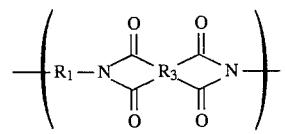

(9)

wherein $R_1$ is a divalent aromatic group selected from the class consisting of

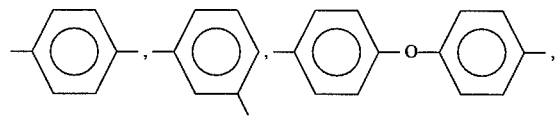

etc., and $R_2$ and $R_3$ are tetravalent aromatic groups selected from the class consisting of

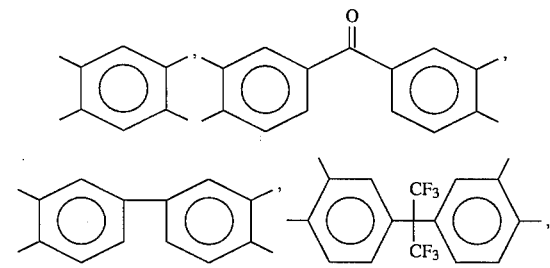

etc., where they are selected to be different each other.

The final shaped article may consist of the polyimide alone or as a blend with other polymers and/or modified with inert materials. Depending on their nature, the inert materials may be added before or after shaping.

The intermediate polymer, the polyamic acid ester, consisting of repeating units of the formula (4) can also be used as a coating composition or as an adhesive layer, being converted in situ to the corresponding polyimide. The polymer solution, either alone or modified by the addition of fillers and/or foaming agents, may be applied by any of usual techniques to a great variety of substrates.

Meanwhile, the diamine monomers of the present invention may be applied to the preparation of various kinds of polymers such as polyamide-imide, polymide-urea and so on which contain imide units in the backbone structure, by reacting with a variety of commercially avaliable difunctional monomers.

The present invention will now be described in more detail in connection with the following examples which should be considered as being exemplary and not limiting the present invention. Hereinafter, the names of the diamine monomers and several kinds of reactants as recited in the following examples describe that they art mixtures consisting of two or three isomers; for a specific instance, N,N'-bis(4-aminophenyl)- 4,4'(4,3' or 3,3')-diisopropoxycarbonylbiphenyl-3,3'(3,4' or 4,4')-dicarboxamide means that it is an isomeric mixture consisting of N,N'-bis(4-aminophenyl)-4,4'-diisopropoxycarbonylbiphenyl-3,3'-dicarboxamide, N,N'-bis(4-aminophenyl)-4,3'-diisopropoxycarbonylbiphenyl-3,4'-dicarboxamide, and N,N'-bis(4-aminophenyl)-3,3'-diisopropoxycarbonylbiphenyl-4,4'-dicarboxamide.

EXAMPLE 1

A mixture of 50 g of pyromellitic dianhydride and 300 ml of ethanol was charged into a 500 ml glass vessel and refluxed for 4 hours. The reactor was cooled to room temperature and the solvent was removed by evaporation under reduced pressure from the resulting mixture to obtain 71.3 g of 2,5(4,6)-diethyl ester of pyromellitic acid.

A mixture of the said 2,5(4,6)-diethyl ester of pyromellitic acid 31 g and thionyl chloride 60 g was charged into a 300 ml glass reactor and refluxed for 3 hours. After cooling the mixture, excess thionyl chloride was evaporated under reduced pressure.

Thereafter, to the reaction mixture were added 200 ml of N,N-dimethylacetamide and 27.6 g of 4-nitroaniline. The mixture was stirred at room temperature for 1 hour, and poured into 1 l of water with stirring to give white precipitates. The resulting precipitate was filtered, washed with aqueous HCl (5%) and water, and dried under reduced pressure to afford 45.1 g of N,N'-bis(4-nitrophenyl)-4,6(2,5)-diethoxycarbonylbenzene- 1,3(1,4)-dicarboxamide (yield 82%).

A mixture of 20 g of the said N,N'-bis(4-nitrophenyl)-4,6(2,5)-diethoxycarbonylbenzene- 1,3(1,4)-dicarboxamide, 1 g of 10% Pd/C, and 350 ml of N,N-dimethylformamide was vigrously agitated with introduction of hydrogen at 40°~45° C. After about 10 hours, the solution mixture was cooled to room temperature and filtered so as to separate catalyst from the mixture. The filtrate was precipitated in water and filtered to obtain yellow powder. The resulting powder was dissolved in 1 l of aqueous solution of HCl (5%) and insoluble materials were filtered off. The filtrate was neutralized with aqueous sodium carbonate to give yellow precipitates. The precipitates were filtered, washed with water, and dried under vacuum. 15.3 g of N,N'-bis(4-aminophenyl)-4,6(2,5)-diethoxycarbonylbenzene-1,3(1,4)-dicarboxamide of yellow powder was obtained (yield 68%).

Elemental Analysis $C_{26}H_{26}N_4O_6$ Calcd. C: 63.67, H: 5.31, N: 11.43 Found C: 63.52, H: 5.25, N: 11.28 $^1$H NMR (60 MHz, DMSO-$d_6$): 10.1ppm (s, 2H), 7.9 (t, 2H), 6.4 (d, 4H), 7.3 (d, 4H), 5.0 (s, 4H), 4.2 (q, 4H), 1.2 (5,6H)

EXAMPLE 2

A mixture of 3,3',4,4'-biphenyltetracarboxylic dianhydride 75 g, isopropyl alcohol 350 ml, triethylamine 1.5 ml was charged into a 500 ml glass vessel and stirred at reflux for 10 hours.

After all the solid materials dissolved clearly, the reaction mixture was cooled to room temperature and evaporated to dryness. The resulting white solid was triturated with n-hexane, filtered and dried in a vacuum oven at 100° C. to obtain 100 g of 3,3'(3,4' or 4,4')-diisopropyl ester of 3,3',4,4'-biphenyltetracarboxylic acid.

To a mixture of 3,3'(3,4' or 4,4')-diisopropyl ester of 3,3',4,4'-biphenyltetracarboxylic acid 20.7 g, tetrahydrofuran 250 ml and triethylamine 13.9 ml was added slowly 9.6 ml of ethylchloroformate with cooling at below −10° C. After about 30 minutes, the reaction mixture was slowly added to a solution consisting of p-phenylenediamine 21.6 g and tetrahydrofuran 200 ml with virgorous agitation and stirred further for 10 hours at room temperature. The resulting mixture was filtered in order to remove triethylamine hydrochloride and the filtrate was concentrated to 150 ml by evaporation under reduced pressure followed by precipitation in 1.4 l of ethyl ether to result in yellow precipitate. Filtration of the precipitate afforded yellow powder and reprecipitation from DMF into water followed by filtration, washing and drying under vacuum gave 20 g of N,N'-bis(4-aminophenyl)-4,4'(4,3' or 3,3')-diisopropoxycarbonylbiphenyl- 3,3'(3,4' or 4,4')-dicarboxamide (yield 67.3%).

Elemental Analysis $C_{34}H_{34}N_4O_6$ Calcd. C: 63.67, H: 5.76, N: 9.42 Found C: 68.50, H: 5.55, N: 9.21 $^1$H NMR (300 MHz, DMSO-$d_6$) 10.14 (t, 2H), 8.20–7.70 (m, 6H), 7.44 (d, 4H) 6.57 (d, 4H), 5.06 (m, 2H), 4.96 (s, 4H), 1.20 (m, 12H)

EXAMPLE 3

The procedure in Example 2 was repeated using 3,3',4,4'-benzophenonetetracarboxylic dianhydride and 4,4'-diaminophenyl ether in place of 3,3',4,4'-biphenyltetracarboxylic dianhydride and p-phenylenediamine.

The resulting product was further purified by column chromatography on silica with ethyl acetate as an eluent. The final product isolated was 4,4'(4,3' or 3,3')-diisopropoxycarbonylbenzophenone-3,3'(3,4' or 4,4')-dicarboxamide (yield 60%).

Elemental Analysis Calcd C: 69.96, H: 5.25, N: 6.94 Found C: 70.11, H: 5.42, N: 6.80 $^1$H NMR (300 MHz, CD$_3$CN) 9.04 (q, 2H), 8.20~7.60 (m, 6H), 7.52 (m, 4H), 6.90~6.55 (m, 12H), 5.08 (m, 2H), 4.02 (s, 4H), 1.18 (m, 12H)

EXAMPLE 4

Pyromellitic dianhydride 100 g and isopropanol 400 ml were charged into a 1 l glass vessel and refluxed for 3 hours. After all the solids dissoved clearly, the mixture was evaporated to dryness under reduced pressure to produce 153 g of 2,5(4,6)-diisopropyl ester of pyromellitic acid.

To the mixture of the said 2,5(4,6)-diisopropyl ester of pyromellitic acid 10 g, tetrahydrofuran 100 ml and triethylamine 8 ml was added slowly ethylchloroformate 5.7 ml with cooling at below −10° C. After stirring for 30 minutes at that temperature, the reaction mixture was added to the flask charged with p-phenylenediamine 10 g and tetrahydrofuran 50 ml. The resulting mixture was stirred for 10 hours and heated at 60° C. for 10 minutes. The mixture was cooled to room temperature and filtered the precipitates formed during the reaction. The precipitates were washed with hot water and dried under reduced pressure to give 7.9 g of N,N'-bis(4-aminoph diisopropoxycarbonylbenzene-1, 3(1,4)-dicarboxamide (yield 51.5%).

Elemental Analysis $C_{28}H_{30}N_4O_6$ Calcd C: 64.85, H: 5.83, N: 10.80 Found C: 64.70, H: 5.81, N: 10.73 $^1$H NMR (300 MHz, DMSO-$d_6$) 10.21 (d, 2H), 7.89 (t, 2H), 7.37 (d, 4H) 6.55 (d, 4H), 5.06 (m, 2H), 5.03 (s, 4H), 1.19 (m, 12H)

EXAMPLE 5

Procedure in Example 4 was repeated using 2,5-diisopropylester of pyromellitic acid in place of 2,5(4,6)-diisopropylester of pyromellitic acid. 2,5-diisopropylester of pyromellitic acid was produced by separation of one isomer from the mixture of 2,5(4,6)-diisopropyl ester of pyromellitic acid.

The solution mixture obtained from the reaction of isopropanol was stood for 1 day at room temperature to give crystalline solids of 2,5-diisopropyl ester of pyromellic acid. After filtration and drying of the solids, employing the same conditions as in Example 4, the said 2.5-diisopropylester of pyromellitic acid afforded N,N'-bis(4-aminophenyl)-2,5-diisopropoxycarbonylbenzene- 1,4-dicarboxamide.

This final product was one of the structurally isomeric products produced in Example 4 and characterized by elemental analysis and $^1$NMR spectrum, the results of which were compared with those of the products in Example 4.

Elemental Analysis $C_{28}H_{30}N_4O_6$ Calcd C: 64.85, H: 5.83, N: 10.80 Found C: 64.76, H: 5.80, N: 10.70 $^1$H NMR (300 MHz, DMSO-$d_6$) 10.21 (s, 2H), 7.89 (s, 2H), 7.37 (d, 4H) 6.55 (d, 4H), 5.06 (h, 2H), 5.03 (s, 4H), 1.19 (d, 12H)

EXAMPLE 6

A series of diamine monomers were prepared in accordance with the present invention by employing the same or simmilar conditoins in the Examples 1~5. The diamine monomers were included by the formula (2),

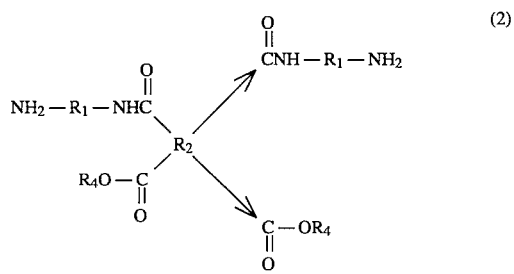

(2)

wherein $R_1$, $R_2$ and $R_4$ are as previously defined.

When the monomers were prepared employing the procedure in Example 1, one of the aromatic dianhydrides of the general formula (10),

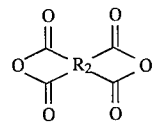

wherein $R_2$ is as previously defined, one of the aliphatic alcohols such as ethanol and isopropanol, and one of the aromatic nitroamines such as 4-nitroaniline, 3-nitroaniline and 4-(4-nitrophenoxy)aniline were used as reactants in place of pyromellitic dianhydride, ethanol and 4-nitroaniline in Example 1, in accordance with the compositions coming within the scope of the formula (2).

When the procedures in Examples 2~5 were applied to prepare the monomers, one of the aromatic dianhydrides of the formula (10), one of the alcohols such as ethanol and isopropanol, and one of the aromatic diamines such as p-phenylenediamine, m-phenylenediamine and 4,4'-diaminophenyl ether were used as reactans in the same manner.

Table I shows a number of diamine monomers prepared by the methods described in Examples 1~5, where $R_1$, $R_2$ and $R_4$ are defined coming within the scope of the formula (2). The results of elemental analyses are shown in Table II. The heading "Yield" in Table I corresponds to the monomer yield as recited in the Examples 1~5. The heading "Procedure" in both tables corresponds to the Example number which was employed to prepare the corresponding diamine monomers.

TABLE I

| Sample No. | $R_1$ | $R_2$ | $R_4$ | Procedure | Yield* |
|---|---|---|---|---|---|
| 1 | phenyl | benzene | ethyl | 1 or 4 | 68(1), 50(4) |
| 2 | phenyl | benzene | ethyl | 1 or 4 | 65(1), 48(4) |
| 3 | diphenyl ether | benzene | ethyl | 1 or4 | 45(1), 35(4) |
| 4 | phenyl | biphenyl | ethyl | 1 or 2 | 60(1), 62(2) |
| 5 | phenyl | biphenyl | ethyl | 1 or 2 | 58(1), 63(2) |

TABLE I-continued
| Sample No. | R₁ | R₂ | R₄ | Procedure | Yield* |
|---|---|---|---|---|---|
| 6 | 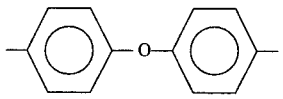 | 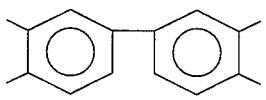 | ethyl | 1 or 3 | 55(1), 30(3) |
| 7 | 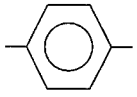 | 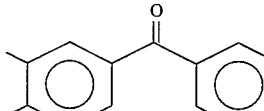 | ethyl | 3 | 67(3) |
| 8 | 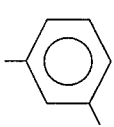 | 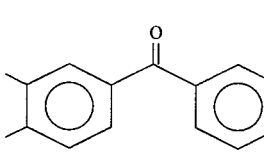 | ethyl | 3 | 67(3) |
| 9 | 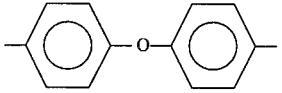 | 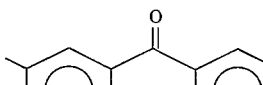 | ethyl | 3 | 41(3) |
| 10 | 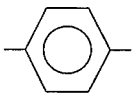 | 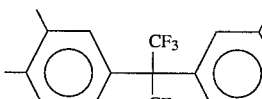 | ethyl | 1 or 2 | 60(1), 62(2) |
| 11 | 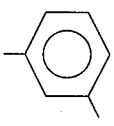 | 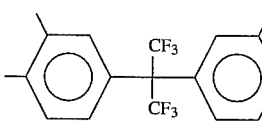 | ethyl | 1 or 2 | 55(1), 57(2) |
| 12 | 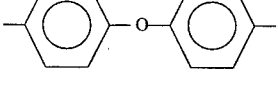 | 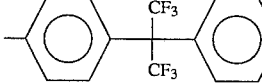 | ethyl | 1 or 3 | 50(1), 35(3) |
| 13 |  | 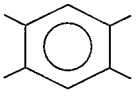 | isopropyl | 1, 4 or 6 | 55(1), 52(4)61(5) |
| 14 | 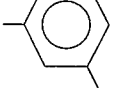 |  | isopropyl | 1, 4 or 5 | 55(1), 54(4)70(5) |
| 15 | 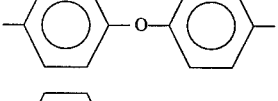 | 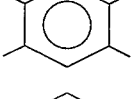 | isopropyl | 1, 4 or 5 | 65(1), 35(4)40(5) |
| 16 | 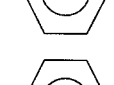 |  | isopropyl | 1 or 2 | 70(1), 67(2) |
| 17 | 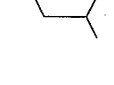 | 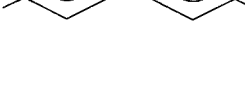 | isopropyl | 1 or 2 | 68(1), 65(2) |

TABLE I-continued

| Sample No. | R₁ | R₂ | R₄ | Procedure | Yield* |
|---|---|---|---|---|---|
| 18 | -C₆H₄-O-C₆H₄- | biphenyl | isopropyl | 1 or 3 | 60(1), 45(3) |
| 19 | -C₆H₄- | benzophenone | isopropyl | 3 | 67(3) |
| 20 | -C₆H₄(CH₃)- | benzophenone | isopropyl | 3 | 59(3) |
| 21 | -C₆H₄-O-C₆H₄- | benzophenone | isopropyl | 3 | 37(3) |
| 22 | -C₆H₄- | -C₆H₄-C(CF₃)₂-C₆H₄- | isopropyl | 1 or 2 | 60(1), 58(2) |
| 23 | -C₆H₄(CH₃)- | -C₆H₄-C(CF₃)₂-C₆H₄- | isopropyl | 1 or 2 | 62(1), 60(2) |
| 24 | -C₆H₄-O-C₆H₄- | -C₆H₄-C(CF₃)₂-C₆H₄- | isopropyl | 1 or 3 | 59(1), 32(2) |

*The number in parenthesis shows an exmple number denoting employed procedure.

TABLE II

| Sample No. | Procedure | Calculated (%) | | | Found (%) | | |
|---|---|---|---|---|---|---|---|
| | | C | H | N | C | H | N |
| 2 | 1 | 63.67 | 5.31 | 11.43 | 63.40 | 5.23 | 11.35 |
| 3 | 1 | 67.65 | 5.08 | 8.30 | 67.27 | 4.92 | 8.19 |
| 4 | 2 | 67.83 | 5.34 | 9.89 | 67.65 | 5.31 | 9.86 |
| 5 | 2 | 67.83 | 5.34 | 9.89 | 67.70 | 5.30 | 9.78 |
| 6 | 1 | 70.39 | 5.10 | 7.46 | 70.24 | 5.00 | 7.32 |
| 7 | 3 | 66.66 | 5.09 | 9.42 | 66.51 | 4.98 | 9.40 |
| 8 | 3 | 66.66 | 5.09 | 9.42 | 66.37 | 5.00 | 9.29 |
| 9 | 3 | 69.40 | 4.92 | 7.19 | 69.25 | 4.80 | 7.09 |
| 10 | 2 | 58.66 | 4.22 | 7.82 | 58.51 | 4.15 | 7.71 |
| 11 | 2 | 58.66 | 4.22 | 7.82 | 58.47 | 4.15 | 7.75 |
| 12 | 1 | 62.66 | 4.25 | 6.22 | 62.60 | 4.27 | 6.15 |
| 14 | 5 | 64.85 | 5.83 | 10.80 | 64.75 | 5.79 | 10.65 |
| 15 | 5 | 68.35 | 5.45 | 7.97 | 68.30 | 5.42 | 7.91 |
| 17 | 2 | 68.67 | 5.76 | 9.42 | 68.42 | 5.56 | 9.25 |
| 18 | 1 | 70.94 | 5.44 | 7.19 | 70.57 | 5.40 | 7.05 |
| 20 | 3 | 67.51 | 5.50 | 9.00 | 67.11 | 5.44 | 8.76 |
| 21 | 3 | 69.96 | 5.25 | 6.94 | 70.11 | 5.42 | 6.80 |
| 22 | 2 | 59.68 | 4.60 | 7.52 | 59.50 | 4.49 | 7.42 |
| 23 | 2 | 59.68 | 4.60 | 7.52 | 59.54 | 4.48 | 7.51 |
| 24 | 1 | 63.36 | 4.56 | 6.03 | 63.16 | 4.44 | 5.79 |

EXAMPLE 7

To a mixture of 4.9 g (0.01 mol) of N,N'-bis(4-aminophenyl)-4,6(2,5)-diethoxycarbonylbenzene- 1,3(1,4)-dicarboxamide and 73 g of N-methyl- 2-pyrrolidinone was added 3,3',4,4'-benzophenonetetracarboxylic dianhydride 3.22 g (0.01 mol) with vigrous stirring under nitrogen atmosphere at room temperature. The resulting mixture was stirred for 2 hours to produce viscous polyamic acid ester solution (0.95 dl/g of inherent viscosity, measured for a solution of 0.5 g/dl at 30° C.). The polyamic acid ester solution was casted on the glass plate and heated for 1 hour each at temperatures of 80° C., 150° C., 250° C. and 350° C., to produce bright yellow transparent polyimide film. An infrared absorption spectrum of the polyimide film was obtained as shown in FIG. 1. In this spectrum, characteristic absorption bands for imide groups were observed near 1780 and 725 cm$^{-1}$. This film had tensile strength of 16.0 kg/mm$^2$ and elongation of 6.5%. It showed glass transition at 358° C. (by Differential Scanning Calorimetry, DSC) and 5% weight loss at 600° C. under nitrogen( by Thermogravimetric Analysis, TGA).

EXAMPLE 8

Employing the same conditions in Example 7, a series of polyimides consisting of repeating units coming within the scope of the formula (1),

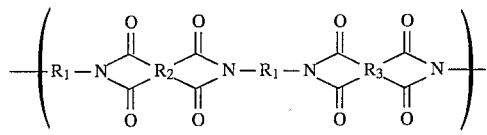  (1)

wherein $R_1$, $R_2$ and $R_3$ are the same as defined above, were produced from the diamine monomers prepared in Example 1~6 and aromatic dianhydrides of the formula (3).

The following Table III shows a number of polyimides produced where $R_1$, $R_2$ and $R_3$ denote for segments in the formula (1). Glass transition temperature ($T_g$)'s and 5% weight loss temperature ($T_d$)'s of those polyimide are also included in Table III.

TABLE III

| Sample No. | $R_1$ | $R_2$ | $R_3$ | $T_g$(°C.) | $T_d$(°C.) |
|---|---|---|---|---|---|
| 25 |  | 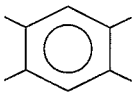 | 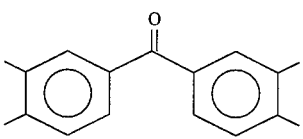 | 358 | 600 |
| 26 | 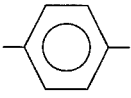 | 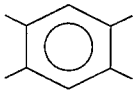 | 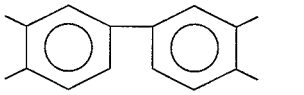 | >450 | 600 |
| 27 | 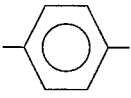 | 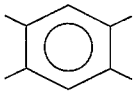 | 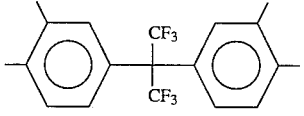 | 361 | 590 |
| 28 | 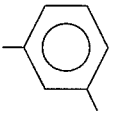 | 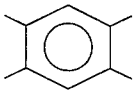 | 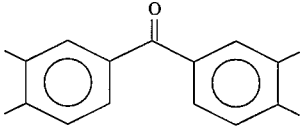 | 329 | 555 |
| 29 | 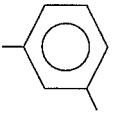 | 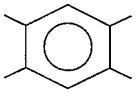 | 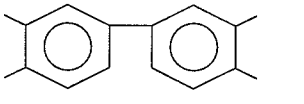 | 362 | 562 |
| 30 | 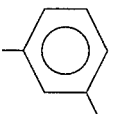 | 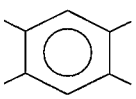 | 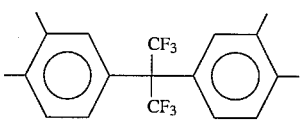 | 321 | 556 |
| 31 | 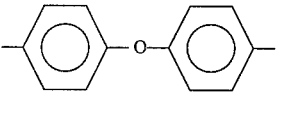 | 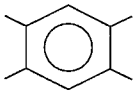 | 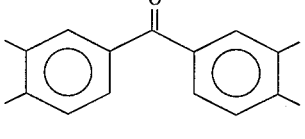 | 307 | 564 |
| 32 | 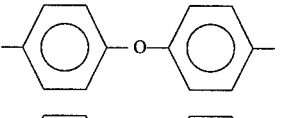 | 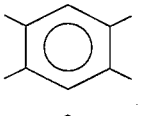 |  | 301 | 586 |
| 33 | 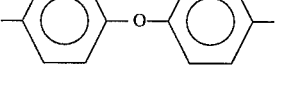 | 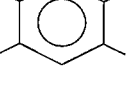 | 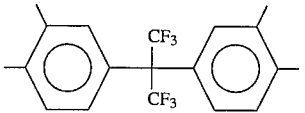 | 290 | 552 |

TABLE III-continued
| Sample No. | R₁ | R₂ | R₃ | $T_g$(°C.) | $T_d$(°C.) |
|---|---|---|---|---|---|
| 34 | 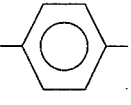 | 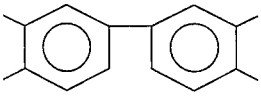 | 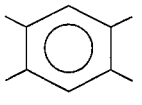 | >450 | 604 |
| 35 | 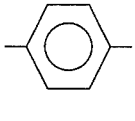 | 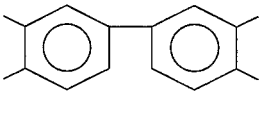 | 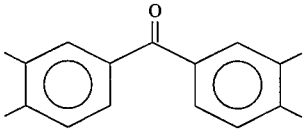 | 363 | 581 |
| 36 | 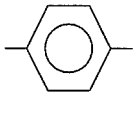 | 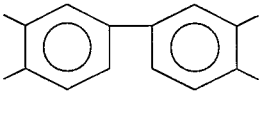 | 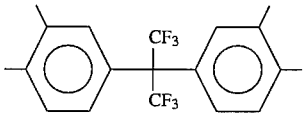 | 358 | 579 |
| 37 | 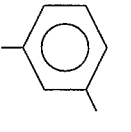 | 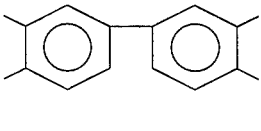 | 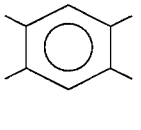 | 365 | 556 |
| 38 |  | 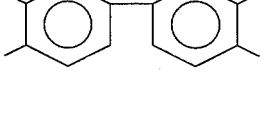 | 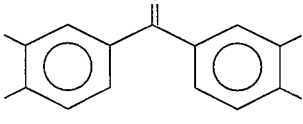 | 307 | 550 |
| 39 | 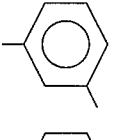 |  | 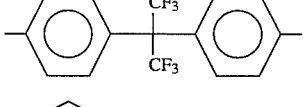 | 318 | 550 |
| 40 |  | 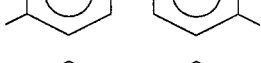 |  | 296 | 587 |
| 41 | 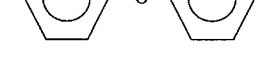 | 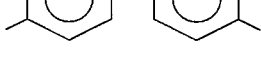 | 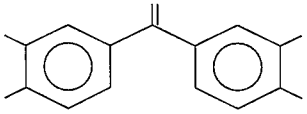 | 275 | 560 |
| 42 | 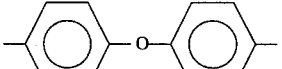 | 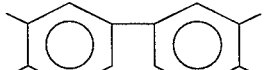 | 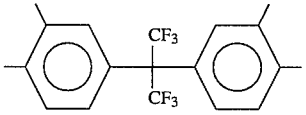 | 271 | 576 |
| 43 | 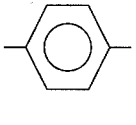 | 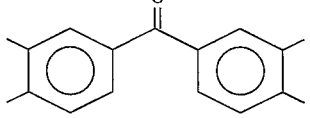 | 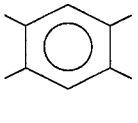 | 359 | 600 |
| 44 | 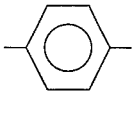 | 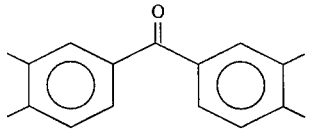 | 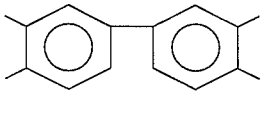 | 362 | 560 |

TABLE III-continued

| Sample No. | R₁ | R₂ | R₃ | $T_g$(°C.) | $T_d$(°C.) |
|---|---|---|---|---|---|
| 45 | phenyl (1,4) | benzophenone | bis(phenyl)C(CF₃)₂ | 325 | 580 |
| 46 | phenyl (1,3) | benzophenone | phenyl | 329 | 560 |
| 47 | phenyl (1,3) | benzophenone | biphenyl | 306 | 555 |
| 48 | phenyl (1,3) | benzophenone | bis(phenyl)C(CF₃)₂ | 289 | 550 |
| 49 | diphenyl ether | benzophenone | phenyl | 307 | 561 |
| 50 | diphenyl ether | benzophenone | biphenyl | 274 | 555 |
| 51 | diphenyl ether | benzophenone | bis(phenyl)C(CF₃)₂ | 277 | 579 |
| 52 | phenyl (1,4) | bis(phenyl)C(CF₃)₂ | phenyl | 360 | 594 |
| 53 | phenyl (1,4) | bis(phenyl)C(CF₃)₂ | benzophenone | 328 | 594 |
| 54 | phenyl (1,4) | bis(phenyl)C(CF₃)₂ | biphenyl | 355 | 575 |
| 55 | phenyl (1,3) | bis(phenyl)C(CF₃)₂ | phenyl | 324 | 560 |

TABLE III-continued

| Sample No. | R₁ | R₂ | R₃ | $T_g$(°C.) | $T_d$(°C.) |
|---|---|---|---|---|---|
| 56 | 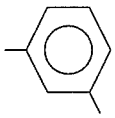 | 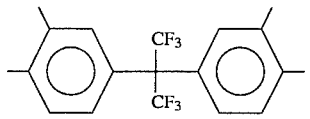 | 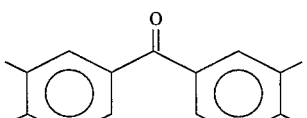 | 285 | 545 |
| 57 | 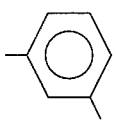 | 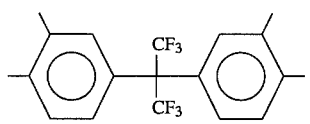 | 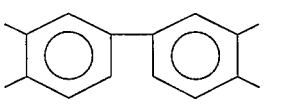 | 315 | 550 |
| 58 | 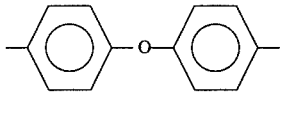 | 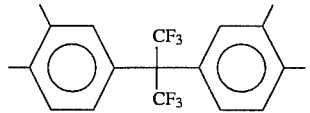 | 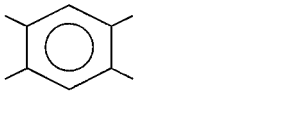 | 297 | 550 |
| 59 | 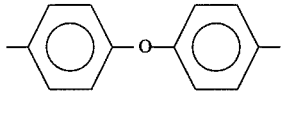 | 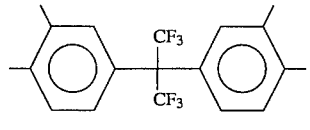 | 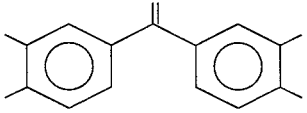 | 280 | 575 |
| 60 | 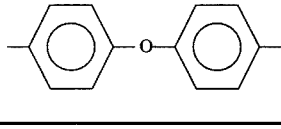 | 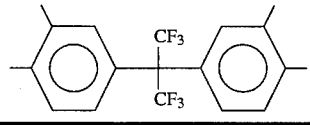 | 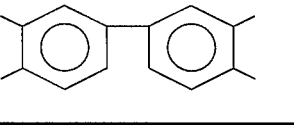 | 268 | 570 |

What is claimed is:

1. A shapeable composition comprising a polyamic acid ester in a solvent, said polyamic acid ester consisting of repeating units of the general formula,

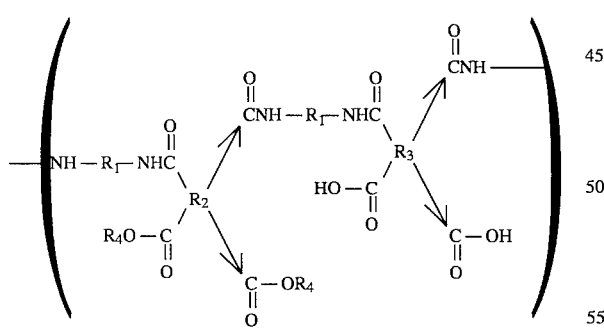

wherein the arrows denote isomerism, R₁ is a divalent aromatic group selected from the group consisting of

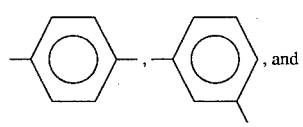, and

-continued

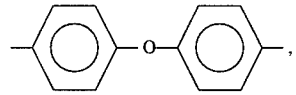,

R₂ and R₃ are different from each other and are tetravalent aromatic groups selected from the group consisting of

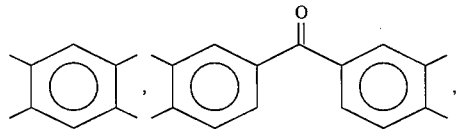

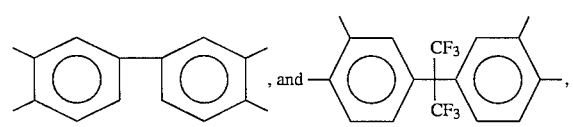

and R₄ is a monovalent aliphatic group selected from the group consisting of ethyl and isopropyl.

2. A polymer comprising an alternating copolyimide consisting of repeating units of the general formula

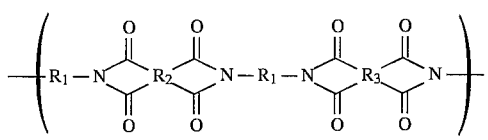

wherein $R_1$ is a divalent aromatic group selected from the group consisting of

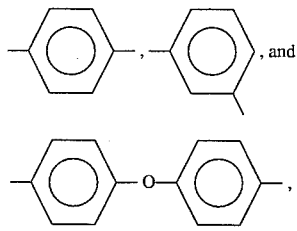

and $R_2$ and $R_3$ are different from each other and are tetravalent aromatic groups selected from the group consisting of

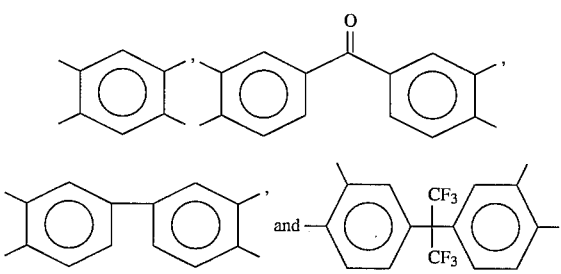

3. A process for preparing an alternating copolyimide consisting of repeating units of the general formula,

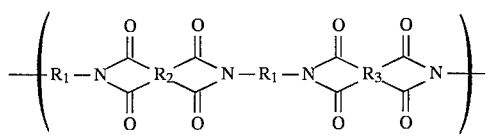

comprising the steps of reacting a diamine monomer of the general formula,

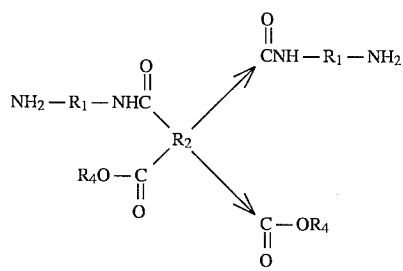

with an aromatic dianhydride of the general formula,

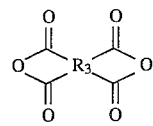

in the presence of an organic solvent to produce a polyamic acid ester consisting of repeating units of the general formula,

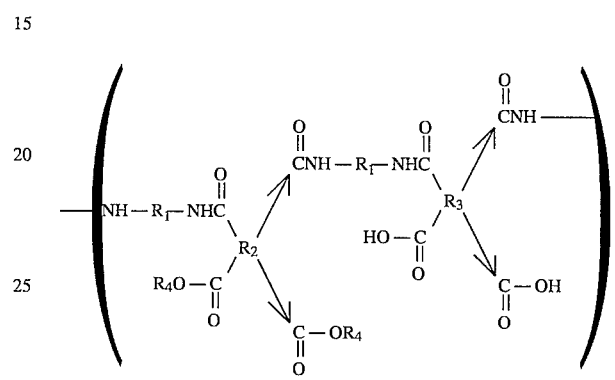

and heating the polyamic acid ester at the temperature range from 50° to 400° C., wherein the arrows denote isomerism, $R_1$ is a divalent aromatic group selected from the group consisting of

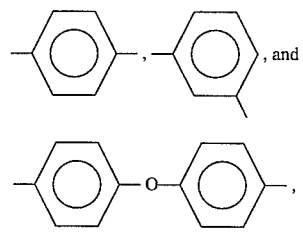

$R_2$ and $R_3$ are different from each other and are tetravalent aromatic groups selected from the group consisting of

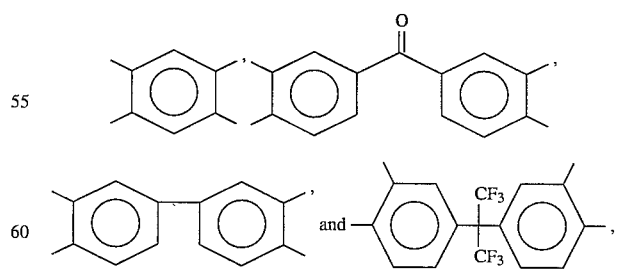

and $R_4$ is a monovalent aliphatic group selected from the group consisting of ethyl and isopropyl.

4. A self-supporting film of a polyimide consisting essentially of repeating units of the general formula

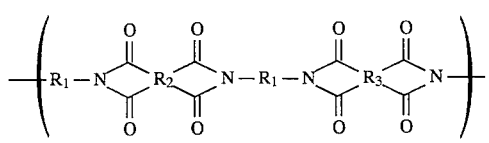

wherein $R_1$ is a divalent aromatic group selected from the group consisting of

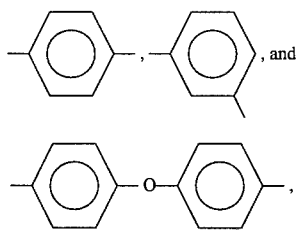

and $R_2$ and $R_3$ are different from each other and are tetravalent aromatic groups selected from the group consisting of

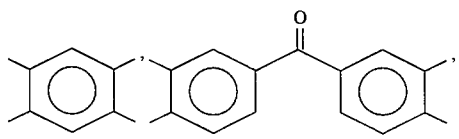

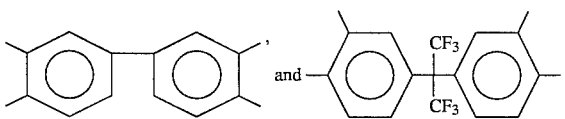

5. The process for preparing an alternating copolyimide according to claim 3, wherein the diamine monomer is selected from the group consisting of N,N'-bis(4-aminophenyl)-4,6(2,5)diethoxycarbonylbenzene- 1,3(1,4)-dicarboxamide, N,N'-bis (4-aminophenyl)-4,4'(4,3' or 3,3')diisopropoxycarbonylbiphenyl-3,3'(3,4' or 4,4')-dicarboximide, 4,4'(4,3' or 3,3')-diisopropoxycarbonylbenzophenone-3,3'(3,4' or 4,4')-dicarboxamide, and N,N'-bis(4-aminophenyl)-2,5-diisopropoxycarbonyl-benezene-1,4-dicarboxamide.

6. The process for preparing an alternating copolyimide according to claim 3, wherein the organic solvent is selected from the group consisting of N,N-dimethylacetamide, N,N-dimethylformamide, N,N-diethylacetamide and N-methyl-2-pyrrolidinone.

7. The process for preparing an alternating copolyimide according to claim 3, wherein the diamine monomer is reacted with the aromatic dianhydride at a temperature below 50° C. for 1 to 24 hours.

\* \* \* \* \*